2,879,138
PYROLYSIS OF PYROSULFURYL FLUORIDE

Earl L. Muetterties, Hockessin, Del., assignor to E. I. du Pont de Nemours and Company, Wilmington, Del., a corporation of Delaware No Drawing. Application April 15, 1955
Serial No. 501,737

8 Claims. (Cl. 23—203)

This invention relates to a new method for preparing sulfur oxyfluorides.

Sulfuryl and thionyl fluorides are potentially important intermediates for the synthesis of fluorocarbon compounds. No method is known, however, which can be made to yield both of these compounds. The known methods for preparing thionyl fluoride include reaction of thionyl chloride with either fluorine or a heavy metal fluoride, such as zinc or antimony. Sulfuryl fluoride is made either by reacting sulfur dioxide with fluorine under conditions which provide for heating the reactants at the point of mixing or by the pyrolysis of barium fluorosulfonate. Although these methods are useful for laboratory preparations they leave much to be desired as practical syntheses from the standpoint of yield and cost of desired products.

This invention has as an object the provision of a simple process adaptable to the synthesis of both sulfuryl and thionyl fluorides employing readily accessible, low cost intermediates. Other objects will appear hereinafter.

These objects are accomplished by the present invention wherein sulfuryl and thionyl fluorides are obtained by pyrolyzing pyrosulfuryl fluoride at a temperature of at least 200° C.

In a convenient way of operating the process of this invention, pyrosulfuryl fluoride is pyrolyzed in contact with a metallic surface which is inert to sulfuryl and thionyl fluorides at a temperature in excess of 200° C. for a time sufficient to bring about its pyrolysis. The volatile reaction product is collected in condensing traps cooled in liquid nitrogen and then transferred to a pressure resistant container for storage and subsequent use.

If the process is to be operated to obtain thionyl fluoride, then the pyrolysis is effected at a temperature of at least 700° C., using either pyrosulfuryl fluoride or sulfuryl fluoride as the precursor.

The following examples in which parts are by weight are illustrative of the invention.

Example I

Twenty-three parts of pyrosulfuryl fluoride was placed in a bomb tube lined with "Hastelloy C." The bomb was closed and then heated to 200° C. (autogenous pressure) for a period of 10 hours. At the end of the run, the volatile materials were collected, and it was shown by infrared analysis that the major constituent was pyrosulfuryl fluoride. The product contained but a small amount of sulfuryl fluoride. This experiment indicates that the minimum temperature for the pyrolysis of pyrosulfuryl fluoride is about 200° C.

Example II

Following the procedure outlined in Example I, 30 parts of pyrosulfuryl fluoride was heated to 500° C. (autogenous pressure) for a period of 3 hours. There was obtained at the end of the reaction 18.3 parts of gaseous product which was shown by infrared analysis to consist mainly of sulfuryl fluoride and sulfur dioxide. There was also obtained 8.5 parts of a liquid which was shown by infrared analysis to consist of pyrosulfuryl fluoride.

Example III

A 30-inch platinum tube, the center section of which was charged with 140 parts of calcium fluoride pellets, was placed in a split furnace which was 13 inches long. The tube was heated to 590° C.–588° C., and the pyrosulfuryl fluoride was vaporized through this tube by bubbling dry nitrogen gas through the liquid fluoride. To the exit end of the platinum tube was connected a conventional cold trap which was cooled with liquid nitrogen. In a period of 45 minutes, a total of 2.7 parts of pyrosulfuryl fluoride was passed. At the end of the reaction there was recovered in the liquid nitrogen trap 1.2 parts of volatile material which was shown by infrared analysis to contain no pyrosulfuryl fluoride but which was mainly sulfuryl fluoride and sulfur dioxide. A trace of thionyl fluoride was also present, indicating that the temperature at which sulfuryl is pyrolyzed to thionyl fluoride was approached.

Example IV

The procedure and apparatus described in the preceding example was employed, and a total of 10 parts of pyrosulfuryl fluoride was passed through the hot tube at 674° C.–676° C. in a period of one hour and 55 minutes. At the end of the reaction, a total of 7.9 parts of volatile material was collected in the liquid nitrogen trap. Infrared analysis showed that the volatile product contained no pyrosulfuryl fluoride but consisted mainly of sulfuryl fluoride and sulfur dioxide. There was present, however, less than 5% thinyl fluoride.

Example V

The procedure and apparatus described in the preceding two examples were employed in this experiment except that the platinum tube was not packed with calcium fluoride. A total of 4 parts of pyrosulfuryl fluoride was passed through the hot tube at 600° C.–625° C. in a period of one hour and 10 minutes. At the end of the reaction there was recovered 2.5 parts of gaseous product in the liquid nitrogen trap. Infrared analysis showed that this product consisted mainly of sulfuryl fluoride and sulfur dioxide. There was present only about 5% thionyl fluoride.

Example VI

The procedure and apparatus outlined in Example III were employed in this experiment. A gaseous mixture of sulfuryl fluoride and nitrogen (in approximately the molar ratio of 3:1) was passed through the platinum tube which was heated to 890° C. In a period of one hour, a total of 3.5 parts of sulfuryl fluoride was passed through the tube. At the end of the reaction, 3 parts of gaseous product was recovered from the liquid nitrogen trap. The product was shown by infrared analysis to consist of sulfuryl fluoride and thionyl fluoride in the molar ratio of 19:1.

Example VII

Following the procedure outlined in the preceding example (except that the platinum tube was not packed with calcium fluoride), a total of 12 parts of sulfuryl fluoride was passed through the platinum tube which was heated to 850° C. The total reaction time was 30 minutes. At the end of the reaction there was recovered from the liquid nitrogen trap 10.6 parts of gaseous material which was shown by infrared analysis to consist of sulfuryl fluoride and thionyl fluoride in the approximate molar ratio of 19:1.

Example VIII

Following the procedure outlined in Example VI, a total of 19.8 parts of sulfuryl fluoride was passed in a period of 40 minutes through the platinum tube which was heated to 1050° C.±30° C. There was recovered from the liquid nitrogen trap a total of 17.5 parts of gaseous product which was shown by infrared analysis to contain sulfuryl fluoride and thionyl fluoride in the molar ratio of 8.5:1.

The conversion of purosulfuryl fluoride to sulfuryl fluoride and/or thionyl fluoride and of sulfuryl fluoride to thionyl fluoride are facilitated when the pyrolysis is conducted in the presence of such reducing agents as sulfur, carbon disulfide, carbon monoxide, and iron sulfides of sulfur:iron atomic ratio greater than 1. These materials increase the conversions at lower temperatures. They also increase the radio of thionyl fluoride to sulfuryl fluoride at higher temperatures. As shown by the following examples, sulfur is effective at around 400° C. and above. Carbon monoxide and carbon disulfide require temperatures of about 500° C. and above to convert pyrosulfuryl fluoride to thionyl fluoride.

Example IX

Twenty parts of pyrosulfuryl fluoride and 7 parts of sulfur were charged in a "Hastelloy C"-lined bomb tube which was then heated to 400° C. for a period of three hours. The bomb was cooled, and then the gaseous material was distilled into a stainless steel cylinder. There was recovered in this manner 21.3 parts of gas. Infrared analysis showed this gas to consist mainly of sulfur dioxide, sulfuryl fluoride, and thionyl fluoride. The molar ratio of sulfuryl fluoride to thionyl fluoride was about 14:1.

Example X

Twenty parts of pyrosulfuryl fluoride and 5 parts of carbon monoxide were charged into a "Hastelloy C"-lined bomb tube. The bomb was closed and heated to 400° C. for a period of three hours. The bomb was cooled, and by distillation, 19.6 parts of condensable gas was obtained. Infrared analysis showed this gas to consist mainly of carbon dioxide, sulfuryl fluoride, carbonyl sulfide, and sulfur dioxide. The presence of thionyl and pyrosulfuryl fluoride was not detected.

Example XI

The center section of a nickel tube one inch in diameter and about 30 inches in length was charged with about 100 g. of an iron sulfide whose composition was about $FeS_{1.2}$. The center section was placed in a 13-inch split furnace. Nitrogen was passed into the tube while it was heated to 400° C. A cold trap cooled with liquid nitrogen was then attached to the exit end of the reactor. To the entrance end of the reactor was attached a bubbler containing 100 g. of pyrosulfuryl fluoride. The nitrogen was then passed through the bubbler to vaporize the pyrosulfuryl fluoride into the reactor tube. The reaction period was 100 minutes. At the end of the reaction time, 8 parts of gas was recovered in the liquid nitrogen trap. Infrared analysis showed that this gas consisted of sulfuryl fluoride and sulfur dioxide. No thionyl fluoride was detected. There was a possible trace amount of pyrosulfuryl fluoride.

Example XII

The center section of a 30-inch platinum-lined nickel tube one inch in diameter was charged with 3/16 inch calcium fluoride pellets. The center section of this tube was then placed in a 13-inch split furnace. Nitrogen was passed through the tube while it was heated to 580° C. Then a liquid nitrogen trap was attached to the exit end of the reactor and to the entrance of the reactor was attached a bubbler containing 10 parts of pyrosulfuryl fluoride. Nitrogen at the rate of one liter per hour and carbon monoxide at the rate of 2.8 liters per hour were passed into the bubbler to vaporize the pyrosulfuryl fluoride into the reactor tube. During the reaction period of about one hour, the temperature varied from 580° C.–600° C. There was recovered in the liquid nitrogen trap 11 parts of gaseous product, after carbon monoxide had been pumped off from the liquid nitrogen trap at reduced pressure. Infrared analysis showed this to consist mainly of carbon dioxide, sulfur dioxide, carbonyl sulfide, sulfuryl fluoride, and thionyl fluoride. The thionyl fluoride and sulfuryl fluoride were present in about equimolar amounts whereas in the absence of carbon monoxide (Example III, above) the thionyl fluoride yield is much less.

Example XIII

Ten parts of pyrosulfuryl fluoride and 5 parts of carbon disulfide were charged in a "Hastelloy C"-lined bomb tube which was closed and then heated to 500° C. for a period of three hours. The bomb was cooled and then 15 parts of gaseous product was distilled into a stainless steel cylinder. This gas was shown by infrared analysis to consist mainly of sulfuryl fluoride, sulfur dioxide, carbonyl sulfide, and carbon dioxide. Also present in smaller amounts were thionyl fluoride and carbon disulfide. The molar ratio of sulfuryl and thionyl fluoride was about 14:1.

Pyrosulfuryl fluoride is highly toxic. Caution must be observed in handling this material.

The pyrosulfuryl fluoride used in the process of this invention is conveniently made by the reaction of a metal fluoride with sulfur trioxide under pressure at a temperature below the decomposition temperature of the pyrosulfuryl fluoride (Hayek et al., Monatsh. 82,942 (1951), Austrian Patent 173,679; Schmidt, Monatsh. 85,452–3 (1954)).

The above examples illustrate static and one-pass processes. However, the pyrolysis can be effected in a continuous flow system with provision for recovery and recycling of unconverted pyrosulfuryl fluoride.

The time required to bring about the pyrolysis of the pyrosulfuryl fluoride in a static system depends upon the temperature conditions used. In a flow system, with provision for recovery and recycling of unconverted pyrosulfuryl fluoride, the time of contact is determined by the temperature of operation and through-put capacity of the equipment.

The pyrolysis of the pyrosulfuryl fluoride is effected at temperatures of at least 200° C. but below the decomposition temperatures of thionyl fluoride. Temperatures of no more than 1800° C. are preferred. As illustrated by Examples I through V at temperatures in the range of 200° C. to 700° C. the principal product of the pyrolysis is sulfuryl fluoride. At a temperature above 700° C. sulfuryl fluoride is pyrolyzed to thionyl fluoride, as shown by Examples VI through VIII. Operating in a static system under autogenous pressure with a three-hour contact time, the reaction product at 200° C. contains trace amounts of sulfuryl fluoride, the remainder being unconverted pyrosulfuryl fluoride. At 500° C. with the same contact time, sulfuryl fluoride and sulfur dioxide are formed but about 30% of the pyrosulfuryl fluoride is recovered unchanged. On the other hand, at 675° C. the product contains sulfuryl fluoride and thionyl fluoride in the molar ratio of $11SO_2F_2:1SOF_2$. As shown by Examples V through VIII at temperatures in the range of 600° C. to 1100° C. sulfuryl fluoride is pyrolyzed to thionyl fluoride.

In a flow system, the the absence of a reducing agent, all of the pyrosulfuryl fluoride is converted to sulfuryl fluoride at 580° C. to 590° C. Under these conditions thionyl fluoride is formed only in trace amounts.

The sulfuryl fluoride can be separated from the thionyl fluoride by fractional distillation, the former boiling at −55.4° C. and the latter at −43.8° C.

When operating in a static system, the process is conducted under autogenous pressure. In a flow system, the process can be operated at atmospheric pressures, and this has a practical advantage in eliminating the need for pressure equipment.

The nature of the equipment used is dependent upon the temperature at which the pyrolysis is to be effected. At 200° C. to 500° C., steel, stainless steel, and iron equipment is satisfactory. At temperatures of 500° C. to 700° C., nickel and nickel alloys and platinum are satisfactory. At temperatures above 700° C., platinum is the satisfactory metal.

The sulfuryl and thionyl fluorides prepared in accord with the process of the invention are useful in the syntheses of fluorocarbon compounds. This use is illustrated below.

*Example A*

A reactor tube lined with a nickel-iron-molybdenum alloy was charged with 46 parts of carbon black and heated at 1000° C. for several hours, while a slow stream of nitrogen was passed through it to remove moisture. A receiver cooled with liquid nitrogen was then attached to the exit end of the reactor, and a stream of sulfuryl fluoride, diluted with three times its volume of nitrogen, was passed through the reactor maintained at 1000° C. A total of 11 parts of sulfuryl fluoride was subjected to reaction with carbon. The condensate in the cooled receiver (6 parts) contained 15%, on a molar basis, of carbon tetrafluoride. This can be separated from the rest of the condensate by fractional distillation. Carbon tetrafluoride is of use as an intermediate in the preparation of tetrafluoroethylene by the process of U.S. Patent 2,709,192.

*Example B*

Thionyl fluoride at 10 to 17 mm. pressure was passed through a carbon arc operated at 19 amperes and 24 volts (D.C.). Fifty-four percent of the thionyl fluoride was converted to fluorocarbons, which consisted of tetrafluoroethylene, carbon tetrafluoride, and hexafluoroethane in the molar ratio of 3:5:2. There was also found in the reaction product carbon bisulfide, carbonyl fluoride and carbonyl sulfide. Hexafluoroethane is convertible to tetrafluoroethylene by the process of U.S. Patent 2,709,182.

*Example C*

Twenty-seven parts of benzophenone and 13 parts of thionyl fluoride were mixed, and the mixture was heated at 300° C. for two hours. There was obtained difluorodiphenylmethane (identified by infrared analysis) in 14% conversion (based on thionyl fluoride).

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of a sulfur oxyfluoride of the class consisting of sulfuryl fluoride and thionyl fluoride which comprises pyrolyzing pyrosulfuryl fluoride at a temperature of at least 200° C.

2. The process of preparing sulfuryl fluoride which comprises pyrolyzing pyrosulfuryl fluoride at a temperature within the range 200°–700° C.

3. The process of preparing thionyl fluoride which comprises pyrolyzing sulfuryl fluoride at a temperature of at least 700° C.

4. Process of claim 3 wherein the sulfuryl fluoride is obtained in situ by the pyrolysis of pyrosulfuryl fluoride.

5. The process for the preparation of a sulfur oxyfluoride of the class consisting of sulfuryl fluoride and thionyl fluoride which comprises pyrolyzing pyrosulfuryl fluoride at a temperature of at least 400° C. in the presence of a member of the class consisting of sulfur, carbon monoxide, carbon disulfide and iron sulfides having a sulfur:iron atomic ratio greater than 1.

6. The process for the preparation of thionyl fluoride from pyrosulfuryl fluoride wherein the pyrosulfuryl fluoride is pyrolyzed in contact with carbon monoxide at a temperature of at least about 500° C.

7. The process for the preparation of thionyl fluoride from pyrosulfuryl fluoride wherein the pyrosulfuryl fluoride is pyrolyzed in contact with sulfur at a temperature of at least about 400° C.

8. The process for the preparation of thionyl fluoride from pyrosulfuryl fluoride wherein the pyrosulfuryl fluoride is pyrolyzed in contact with carbon disulfide at a temperature of at least about 500° C.

References Cited in the file of this patent

UNITED STATES PATENTS

| | | |
|---|---|---|
| 1,364,738 | Durrans | Jan. 4, 1921 |
| 1,765,688 | McKee et al. | June 24, 1930 |

OTHER REFERENCES

Gmelin-Kraut: "Handbuch der Organisch Chemie," vol. 1, part 2, page 203 (1909).

Ind. and Eng. Chemistry, November 1950, page 2225.